United States Patent [19]

Powell et al.

[11] 3,805,600

[45] Apr. 23, 1974

[54] TRANSDUCER DEVICE AND MEASUREMENT SYSTEMS

[75] Inventors: Irene Patricia Powell; Cheadle Hulme; John Hitchcock, all of West Bromwich, England

[73] Assignee: Salter Industrial Measurement Limited, West Bromwich, England

[22] Filed: Nov. 5, 1971

[21] Appl. No.: 196,077

[30] Foreign Application Priority Data

Nov. 25, 1970 Great Britain .................... 55972/70

[52] U.S. Cl. ............................................... 73/88.5 R
[51] Int. Cl. ............................................... G01b 7/16
[58] Field of Search ............ 73/88.5 R, 88.5 SD, 65, 73/398 AR; 338/2, 5, 6; 177/136, 211; 74/519, 473 P

[56] References Cited

UNITED STATES PATENTS

| | | | |
|---|---|---|---|
| 2,768,447 | 10/1956 | Strimel | 73/88.5 R |
| 2,913,690 | 11/1959 | McGrath | 73/88.5 R |
| 3,621,435 | 11/1971 | Stedman | 338/5 |
| 3,669,756 | 6/1972 | Bradley | 177/136 |
| 3,154,066 | 10/1964 | Grindheim et al. | 73/398 AR X |

FOREIGN PATENTS OR APPLICATIONS

| | | | |
|---|---|---|---|
| 628,400 | 8/1949 | Great Britain | 73/88.5 |

*Primary Examiner*—Richard C. Queisser
*Assistant Examiner*—Stephen A. Kreitman
*Attorney, Agent, or Firm*—Markva & Smith

[57] ABSTRACT

A transducer device especially suitable for use in measuring the load applied to an axle of a wheeled vehicle has a pivoted sensing arm arranged operatively to engage and deflect a spring arm, enclosed in a housing, which carries strain gauges in an electrical circuit connected to an indicator device.

11 Claims, 7 Drawing Figures

TRANSDUCER DEVICE AND MEASUREMENT SYSTEMS

DESCRIPTION OF THE INVENTION

The present invention relates to an electromechanical transducer device and to measurement systems incorporating the same.

In one aspect, the invention provides a transducer device comprising a spring member carried by a support body and a pivoted lever member which is pivotally mounted for angular movement upon said support body. The pivoted lever member has a projecting elongate sensing arm extending in a first direction from the pivot point and an actuating arm extending from the pivot point in a direction opposed to said first direction. The actuating arm is arranged operatively to engage said spring member over a given range of angular movement thereby causing the spring member to deflect to an extent dependent on the angular displacement of the sensing arm. The spring member is operatively associated with strain gauge means adapted to be incorporated in an associated electrical circuit to produce a measurable electrical signal or output indicative of the extent of deflection of the spring member and, thereby, of the displacement of the sensing arm.

In a specific embodiment, the spring member is in the form of a spring cantilever arm which is arranged to the support body. Strain gauges are bonded along its length so that the electrical resistances of the strain gauges change when the spring arm is deflected. The pivoted lever member is arranged to engage the free outer end of the spring arm. Also, the support body comprises a housing enclosing the spring member together with the strain gauge means and an inner end portion of the lever member. The elongate sensing arm of the lever member projects outside the housing.

The device will usually have an associated electrical circuit in which the strain gauge means is connected in a Wheatstone Bridge arrangement or variant thereof so that change in the electrical resistance of the strain gauge means produces an electrical signal or output related to the deflection, for feeding to a calibrated measuring device which provides a visual indication or reading and which may be remotely positioned.

Although versatile in their application, transducer devices and systems in accordance with this invention may be especially adapted for use in measuring or registering the loading applied to at least one axle of a vehicle, especially a wheeled vehicle having a chassis or body connected to said axle through resilient suspension means, and can be permanently installed in the vehicle so as to provide indications of the loading, preferably by visual indicating means situated in a position convenient to the driver, whenever required.

BRIEF DESCRIPTION OF DRAWINGS

By way of example, the invention will be more particularly described with reference to the accompanying drawings, wherein.

DESCRIPTION OF SPECIFIC EMBODIMENTS

Figure 1:
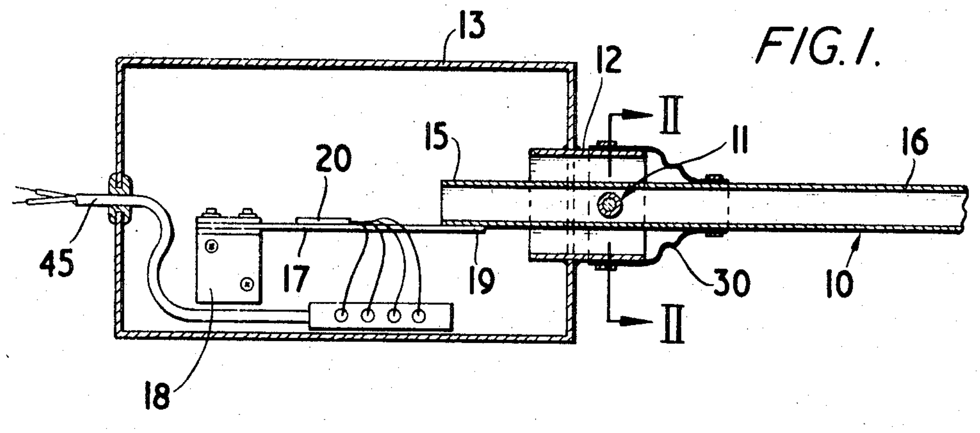
FIG. 1 is a somewhat diagrammatic longitudinal sectional view showing a transducer device constructed in accordance with the invention.
Figures 2, 3:
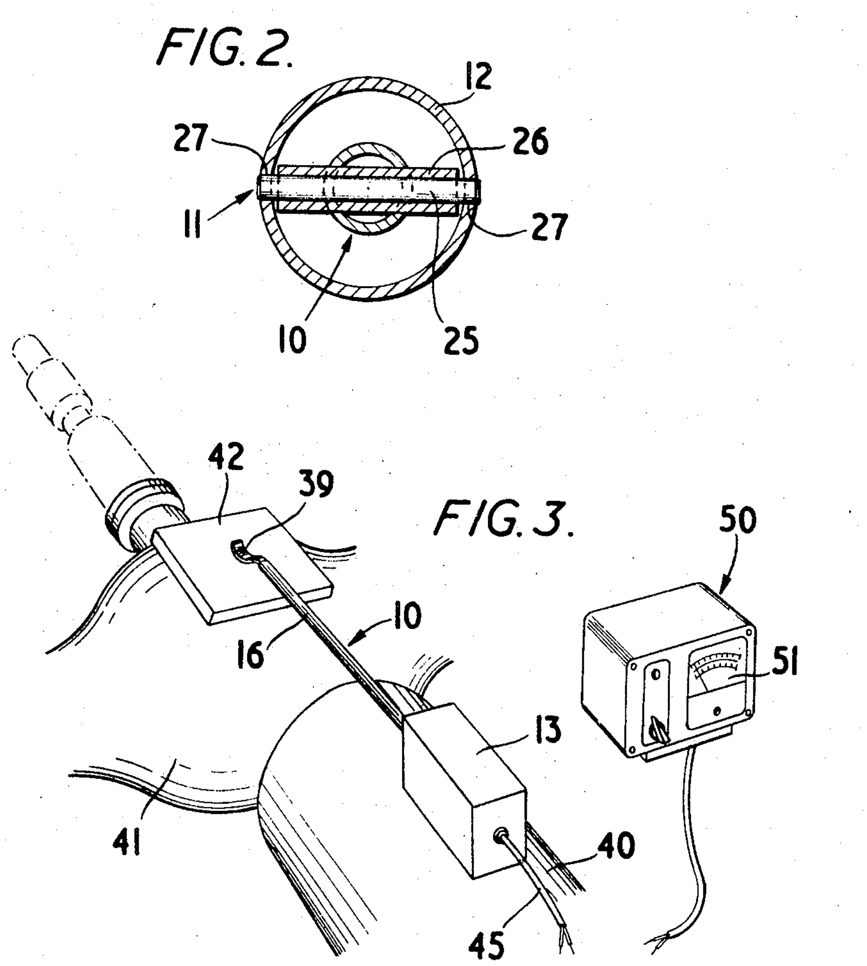
FIG. 2 is a cross-section on line II — II of FIG. 1.
FIG. 3 illustrates diagrammatically the device applied to a vehicle for measurement of the loading on an axle thereof.

Referring firstly to FIGS. 1 and 2, the transducer device illustrated therein comprises an angularly movable lever member 10, shown in the form of a metal tube, pivotally mounted at 11 upon a short tubular extension 12 of a rectangular box-like housing 13 forming a support body.

The inner end portion 15 of the lever member 10 extends inside the housing 13, and the outer end portion, beyond the pivot mounting 11, lies outside the housing and constitutes an outwardly projecting elongate sensing arm 16.

Within the housing 13, there is also positioned a relatively short spring arm 17, in the form of a flat spring blade or leaf, anchored at its inner end to a bracket 18 fixed to a side wall of the housing. The spring arm 17 is of cantilever form and its free outer end portion 19 lies adjacent the inner end portion 15 of lever member 10, as shown.

Towards its inner end, the spring 17 further carries a plurality of strain gauges, indicated at 20, which are bonded, such as by adhesive for example, to arm 17 so that they are deformed and undergo a corresponding change in electrical resistance when the arm 17 is deflected and caused to bend.

Thus, it will be clear that when the lever member 10 is moved in a counter-clockwise direction, as viewed in FIG. 1, the inner end portion 15 engages the end portion 19 of spring arm 17 and causes the latter to deflect downwardly according to the extent of angular displacement of sensing arm 16, and this displacement can be measured by measuring the corresponding changes in electrical resistance of the strain gauges 20.

In practice, the latter are usually connected, in known manner, in an electrical circuit of conventional form providing a Wheatstone Bridge or similar arrangement designed to produce an electrical output which is fed to suitably-calibrated indicating means. It may further be possible to design the system so that the magnitude of the electrical output is directly proportional, in linear relationship, to the angular deflection of the sensing arm 16.

In order that the deflection of the spring arm 17 and electrical output of the strain gauge circuit shall maintain a precise predetermined relationship with the extent of angular deflection or displacement of the sensing arm 16, it is necessary that the lever member 10 be accurately located on its pivot mounting 11. In this somewhat diagrammatic representation of FIGS. 1 and 2, the pivot mounting 11 is shown as being formed by a hardened pivot pin 25 journalled in an elongate bearing sleeve 26 secured in a transverse bore extending through the tubular lever member 10. The ends of the pivot pin 25 project beyond the sleeve 26 and are secured in sockets 27 formed in the wall of the housing extension 12. More sophisticated bearing arrangements, however, may be employed if desired in order further to improve wear characteristics.

It will be noted that the pivot mounting 11 is shown as being enclosed within a flexible gaiter or covering 30, composed of rubber for example. If desired, the housing 13 can readily be completely sealed so as to prevent the ingress of dirt and moisture which could, in time, have harmful effects under operational conditions.

The strain gauges 20, for example, four in number arranged in two spaced pairs and connected respectively in the four arms of a Wheatstone Bridge arrangement, each conveniently comprise a fine wire mesh encased in a flexible insulating covering firmly secured, as by adhesive bonding, to a face of the spring arm 17.

It will be appreciated that the sensitivity of the device, for a given size of the lever member 10, will depend on the position of the point of contact between the inner end 15 of the latter and the spring arm 17. By moving the spring arm 17 towards or away from the lever member 10 (in a horizontal direction in FIG. 1), the sensitivity may be varied, and for this purpose the bracket anchorage 18 of spring arm 17 may be provided with means for horizontal adjustment (not shown), such as slots, for example, to receive clamping screws securing the anchorage in place.

Similarly, provision may be made for a vertical adjustment whereby the outer end of the spring arm 17 can be initially spaced from the inner end portion 15 of lever member 10 (when the latter is in an initial "at-rest" position), instead of being in contact therewith as shown in FIG. 1, so that the transducer device will only operate after the sensing arm has first been deflected by a predetermined initial amount and give readings only over a limited predetermined range.

On applying the transducer device to register the loading applied to an axle of a wheeled vehicle, advantage is taken of the fact that the axle load produces movement of the usual resilient vehicle suspension and causes the axle to be displaced relative to the vehicle body or chassis. The transducer device can therefore be utilized to respond to such relative axle to chassis displacement by fixing the support body housing 13 to a part of the chassis, or to a member secured to the latter, in such a position that the sensing arm 16 lies in the path of relative movement of the axle and is engaged and deflected thereby when under load. That is, as disclosed herein, the sensing arm 16 has a length effective to sense displacement of the axle of the wheeled vehicle.

Such an arrangement is illustrated in the diagrammatic view of FIG. 3 which shows the housing 13 fixed to a chassis member 40 and the sensing arm 16 has a shoe 39 at its outer end which bears against the axle casing 41 through an interposed pad 42.

The strain gauges 20 of the transducer device are connected through an appropriate multi-core cable 45, into an electrical circuit containing suitable resistance measuring or balancing means, such as a Wheatstone Bridge, adapted to provide an electrical signal or output which is passed to a read-out meter or other convenient indicator 51 in a head unit 50, situated preferably in the driver's cab in a heavy goods vehicle, which meter to indicator 51 may be calibrated to give a direct visual indication of the weight borne by the respective axle.

As the axle loading of a vehicle is usually only of interest in a region approaching maximum load, the relative initial positions of the spring arm and of the pivoted lever member may, in this application of the device, conveniently be set, if desired, so that the device only functions over a limited range towards full load. This, together with "built-in" response characteristics which compensate for irregularities or non-linearity in the load/deflection characteristics inherent in the vehicle suspension, can facilitate enabling a visual indicator to be used which has a strictly linear scale calibrated directly in units of weight.

Apart from use for measuring axle loading in a vehicle, many other uses are possible for the transducer device. To mention but two more examples, it could for instance be used as a direct weighing device or for the measurement of distances or length relative to a predetermined standard.

For use as a direct weighing device, the transducer shown in FIG. 1 may be inverted and the loads to be measured are supported at a predetermined point on the arm 16 of lever member 10 so as to displace the latter and deflect the spring arm 17 to a position of counterbalance. The weight may then be deduced by measurement of the electrical output after the device has first been appropriately calibrated, and, if means are incorporated for adjusting the relative positioning of the lever member 10 and spring arm 17, a wide range of weight loadings may be accommodated.

In use for measuring distances or length, the transducer device may be fixed in a predetermined position to form part of a gauge which can, for example, be employed in batch sampling schemes to check whether or not the dimensions of sample articles or components fall within given tolerance limits.

If required, the transducer device described could be modified to respond to deflection of the lever member in either a clockwise or anti-clockwise sense relative to a given initial "at-rest" position. This could be achieved, for example, by providing the inner end portion of the lever member with an axially extending slot or forked configuration between the sides of which is disposed the outer end portion of the spring arm.

Figures 4, 5, 6:
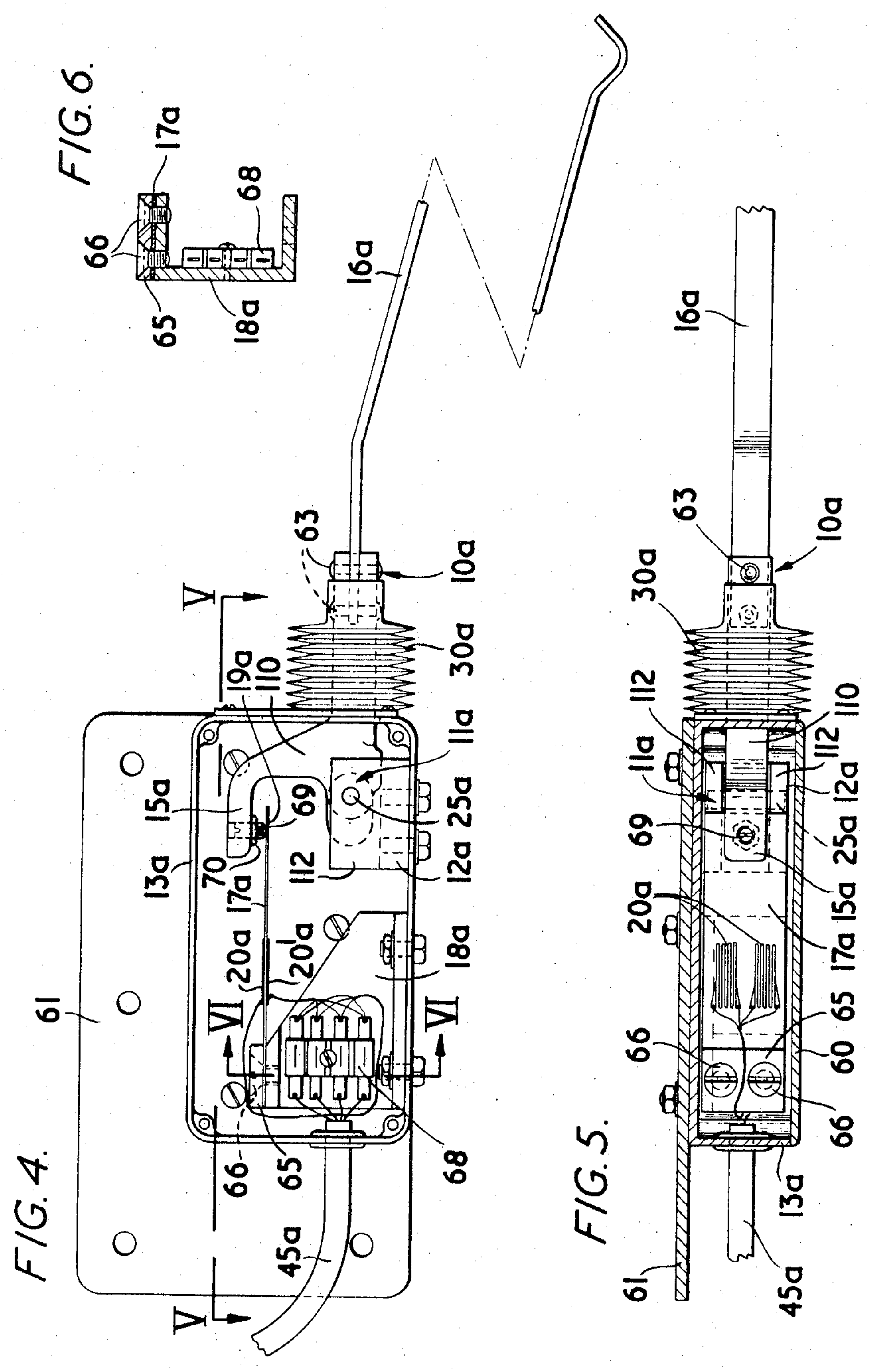
FIG. 4 is a more detailed side elevational view, with a cover plate removed, of a transducer device according to a preferred practical embodiment of the invention for use in measurement of the loading on an axle of a wheeled vehicle.
FIG. 5 is a horizontal section on line V — V of FIG. 4.
FIG. 6 is a fragmentary vertical section on line VI — VI of FIG. 4.

It will, however, be further understood that many other modifications in the constructional details herein described can also be made, if desired, within the scope of the invention as defined in the appended claims, and by way of more specific example, a preferred practical embodiment of the transducer device designed primarily for use in weighing vehicle axle loads is shown in more detail in FIGS. 4, 5 and 6.

In these views of FIGS. 4, 5 and 6, the same reference numerals, or with an additional suffix *a*, are used as before to denote corresponding parts. It will be seen that in this embodiment, the lever member **10*a* comprises a body portion 110 pivotally mounted at 11*a* by means of a pivot pin 25*a* between side cheeks 112, 112, of a lever supporting bracket 12*a* bolted to the base of a box-like housing 13*a*. Housing 13*a* is provided with a detachable cover plate 60 (FIG. 5) and is carried by a back-plate 61** adapted to be firmly secured to a stationary part of the vehicle body or chassis.

As shown, the lever member **10*a* has an elongate sensing arm 16*a* which projects outside the housing 13*a* and which is secured to body portion 110 by rivets 63,** and a flexible rubber gaiter 30*a* is fitted to seal the necessary opening in the end of the housing.

Within the housing, the spring arm 17*a* consists of a cantilever flat spring blade or leaf secured at its inner end by a clamping plate 65 and clamping screws 66 to a mounting bracket 18*a* bolted to the base of the housing. Towards its inner end, the spring arm 17*a* has two pairs of strain gauges 20*a*, 20'*a*, bonded to its upper and lower faces respectively, and these are connected through individual wires and a terminal block 68, attached to the bracket 18*a*, to the multi-core cable 45*a*. Also, the outer end of the spring arm 17*a* is engaged, as shown, by a screw-threaded stud 69 carried by the offset inner end 15*a* of the body portion 110 of the lever member 10*a*. The stud 69 is provided with a locknut 70 and can be adjusted during assembly so as to control the range of angular movement of the lever member over which the device is operative.

Figure 7:
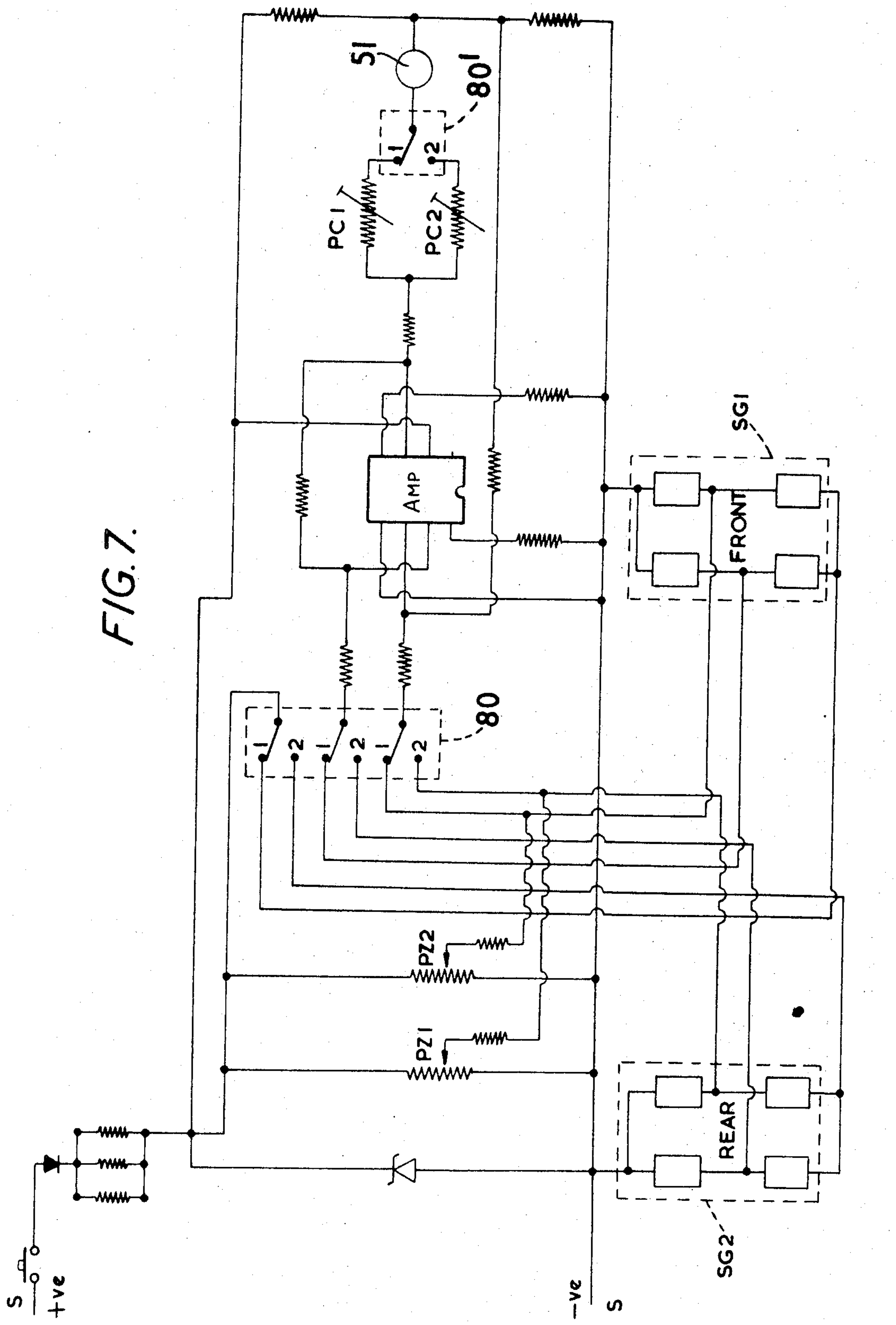
FIG. 7 is a diagram of a typical associated electrical circuit for use with a pair of the transducer devices applied to different axles of a wheeled vehicle.

FIG. 7 shows a typical circuit of a vehicle axle load weighing system incorporating a pair of the transducer deflection heads applied respectively to front and rear axles. The circuit is connected through conductors S, S, to the usual 12 volt or 24 volt vehicle power supply, and the sets of strain gauges of the deflection heads applied to said front and rear axles are indicated at SG1 and SG2. These are connected through a selector switch 80 to a Wheatstone Bridge circuit of which the signal output is fed through a calibrated milli-ammeter constituting the calibrated measuring or indicating device 51. PC1 and PC2 represent suitable calibration potentiometers which are selected by switch 80' according to whichever axle load is being measured, and PZ1 and PZ2 represent zeroing potentiometers.

As will be appreciated, the circuit requires relatively few components and the major part thereof can be compactly mounted, in association with the meter 51, in the indicating head unit 50 situated in the driver's compartment.

We claim:

1. A transducer device for use in measuring the load carried by an axle of a wheeled vehicle having a body carrying structure connected to an axle through resilient means, comprising:

a. a support body including a support housing mounted on said vehicle,
b. a spring member carried by the support body,
c. means pivotally mounting a lever member for pivoted angular movement upon said support body,
d. said pivoted lever member including an elongated sensing arm extending in a first direction from the pivot point and an actuating arm extending from the pivot point in a direction opposite to said first direction,
e. said sensing arm having a length effective to sense displacement of the axle of the wheeled vehicle,
f. said actuating arm being operatively engaged at a position along the spring member which is angularly deflected when the sensing arm is displaced from an initial rest position, and
g. strain gauge means connected to said spring member and adapted to be incorporated in an associated electrical circuit to produce a measurable electrical signal or output when said spring member is deflected.

2. A transducer device as defined in claim 1 wherein said support housing encloses the spring member, said spring member is a relatively short cantilever beam having an inner end secured to the housing, said sensing arm is relatively long and projects outwardly from the housing, and said actuating arm is relatively short and is disposed within the housing, said sensing arm having a shoe portion at its outer end for abutting engagement with said axle so that the sensing arm will be displaced when there is any displacement of the axle.

3. A transducer device as defined in claim 1 wherein means are provided to adjust the relative position of an abutting engagement between the spring member and the actuating arm to vary the sensitivy of said transducer device.

4. In a wheeled vehicle having a body carrying structure connected to an axle through resilient suspension means and weighing means for registering the load applied to said axle, said weighing means including a transducer device comprising:

a. a spring member carried by a support body,
b. means pivotally mounting a lever member for pivotal angular movement upon said support body,
c. said pivoted lever member including an elongated sensing arm extending in one direction from the pivot point and an actuating arm extending in another direction from said pivot point,
d. said actuating arm being operatively engaged at a position along the spring member which is angularly deflected by the actuating arm when the sensing arm is displaced from an initial rest position,
e. strain gauge means connected to said spring member and adapted to be incorporated in an associated electrical circuit to produce a measurable electrical signal or output when said spring member is deflected.

5. In a vehicle as defined in claim 4 wherein said support body includes a support housing enclosing the spring member and adapted to be mounted on said vehicle, said spring member is a relatively short cantilever beam having an inner end secured to the housing, said sensing arm is relatively long and projects outwardly from the housing, and said actuating arm is relatively short and is disposed within the housing, said sensing arm having a shoe portion at its outer end for abutting engagement with said axle so that the sensing arm will be displaced when there is any displacement of the axle.

6. In a vehicle as defined in claim 4 wherein a measuring device calibrated in terms of load borne by said axle is electrically connected to said transducer device to receive said electrical output signal which is indicative of the extent of deflection of the spring member.

7. In a vehicle as defined in claim 4 wherein the spring member comprises a spring arm having an inner end and a free outer end, said inner end being fixedly attached to the support body and said outer end being adapted to be engaged and deflected by the actuating arm of said lever member, said strain gauge means being fixedly bonded to said spring arm.

8. In a vehicle as defined in claim 4 wherein the support body comprises a housing which incloses the spring member, strain gauge means and the actuating arm which constitutes the inner end portion of the lever member, said elongated sensing arm projecting outside said housing.

9. In a vehicle as defined in claim 4 wherein the actuating arm of the lever member is adapted to engage and deflect said spring member to produce a resultant electrical output signal over a limited range of high loading on the vehicle axle.

10. In a vehicle as defined in claim 4 wherein the electrical circuit and transducer device provide an electrical output signal of which the magnitude varies substantially linearly with variation of load on the vehicle axle.

11. In a vehicle as defined in claim 4 wherein means are provided to adjust the relative position of an abutting engagement between the spring member and the actuating arm to vary the sensitivity of said transducer device.

* * * * *